United States Patent
Maes

(10) Patent No.: US 12,194,701 B2
(45) Date of Patent: Jan. 14, 2025

(54) CURING MOLD FOR TIRES PROVIDED WITH A VENTING DEVICE AND CURING METHOD THEREFOR

(71) Applicant: COMPAGNIE GENERALE DES ETABLISSEMENTS MICHELIN, Clermont-Ferrand (FR)

(72) Inventor: Laurent Maes, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 233 days.

(21) Appl. No.: 17/786,651

(22) PCT Filed: Dec. 17, 2020

(86) PCT No.: PCT/FR2020/052496
§ 371 (c)(1),
(2) Date: Jun. 17, 2022

(87) PCT Pub. No.: WO2021/123634
PCT Pub. Date: Jun. 24, 2021

(65) Prior Publication Data
US 2023/0034340 A1    Feb. 2, 2023

(30) Foreign Application Priority Data
Dec. 19, 2019 (FR) ...................................... 1914886

(51) Int. Cl.
*B29C 33/10* (2006.01)
*B29D 30/06* (2006.01)

(52) U.S. Cl.
CPC .......... *B29D 30/0606* (2013.01); *B29C 33/10* (2013.01); *B29D 2030/0617* (2013.01)

(58) Field of Classification Search
None
See application file for complete search history.

(56) References Cited

U.S. PATENT DOCUMENTS

| 4,812,281 | A | * | 3/1989 | Beard | ..................... B29C 33/10 264/315 |
| 2015/0165706 | A1 | * | 6/2015 | Gaebelein | .......... B29D 30/0629 264/293 |

FOREIGN PATENT DOCUMENTS

| FR | 1553264 | A | * | 1/1969 | ............. B29C 33/10 |
| FR | 2541624 | A | * | 8/1984 | ......... B29D 30/0606 |

(Continued)

OTHER PUBLICATIONS

International Search Report dated Apr. 19, 2021, in corresponding PCT/FR2020/052496 (4 pages).

*Primary Examiner* — Yung-Sheng M Tsui
(74) *Attorney, Agent, or Firm* — VENABLE LLP

(57) ABSTRACT

A method for curing a tire during which a green tire is pressed against the lining of a curing mold provided with a venting device, the molding surface of the lining forming protrusions that define cavities, the venting device comprising vents that pass through the lining, one cavity being divided into chambers by a protrusion in the form of a blade (26), each cavity closing on one or more vents, at least one of the chambers not closing on a vent, at least one duct (42) passing through the blade (26) so that the chamber(s) that does/do not close on a vent communicate(s) through the duct with a chamber that does close on a vent. The cross-section of the duct (42) has an area of between 0.0001 mm² and 0.25 mm² and, more preferably, 0.01 mm² and 0.1 mm².

10 Claims, 2 Drawing Sheets

(56) References Cited

FOREIGN PATENT DOCUMENTS

Figure 1:
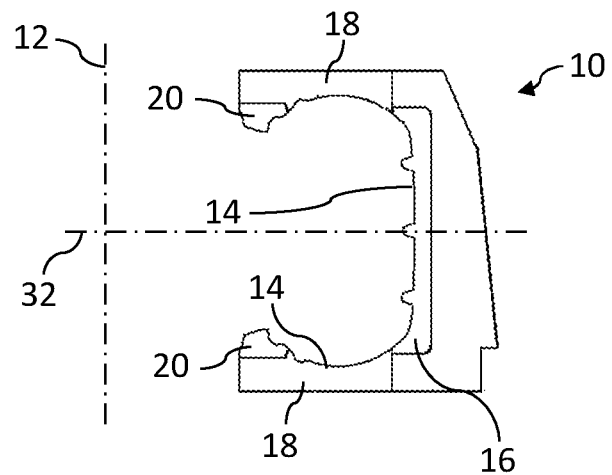

| | | |
|---|---|---|
| GB | 1159901 | 7/1969 |
| JP | 2004-262285 A | 9/2004 |
| KR | 10-2010-0052940 A | 5/2010 |

* cited by examiner

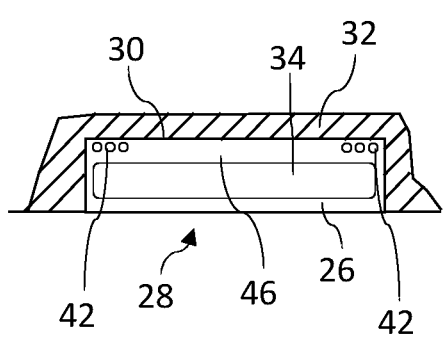 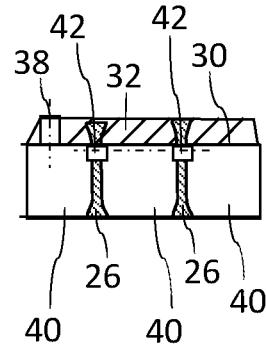 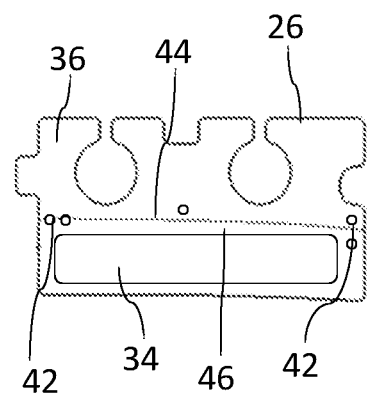
Fig. 3  Fig. 4  Fig. 5

CURING MOLD FOR TIRES PROVIDED WITH A VENTING DEVICE AND CURING METHOD THEREFOR

BACKGROUND

The invention pertains to the field of curing moulds for tyres, and relates more particularly to a curing method for a tyre using a curing mould provided with a venting device, and a method for manufacturing such a mould.

Manufacturing a tyre comprises a curing step during which a green tyre is moulded and vulcanized in order to give the tyre its final properties and appearance. A tyre is cured in a curing mould. A curing mould defines, in a closed position of the mould, a moulding surface formed in particular by a lining, for moulding the tread of the tyre, and two shells, for moulding the sidewalls of the tyre.

The external shape of the tread of a tyre, also known as the "tread pattern" of the tyre, generally comprises hollows or protrusions, such as grooves extending transversely or circumferentially on the tread, parallelepipeds also known as "tread blocks", or sipes extending from the radially outermost surface of a tread block towards the inside of said tread block. In addition, some tread patterns are said to be "highly siped", so that the same tread block can include a plurality of sipes, in particular in order to impart greater flexibility to the tread of the tyre.

The moulding surface of the mould is the negative of the tread pattern of the tyre. A lining element is thus generally made up of fine blades suitable for moulding the sipes, and a body overmoulded around an anchoring portion of the blades, suitable for moulding the larger shapes of the tread pattern.

During the curing step, the green tyre is pressed against the lining so that the uncured gum rubber forming the green tyre enters the cavities in the lining. An air pocket is thus formed between the rubber of the green tyre and certain zones of a cavity, known as "last moulding zones". The last moulding zones are generally situated on a bottom wall or a lateral wall of a cavity, or in the angular portions of a cavity. The angular portions are particularly difficult to mould, and require high moulding pressures.

In order to facilitate the moulding of the last moulding zones and prevent the appearance of moulding defects on the vulcanized tyre known as "short shots", vents consisting of holes are generally made in the body of the lining elements, in line with said portions. The vents make it possible to discharge air during the moulding of the green tyre, and then during vulcanization. Under the effect of the pressure exerted on the green tyre during moulding, the uncured gum rubber enters these holes and forms a protuberance on the tyre known as a "nipple", which is considered to be unattractive.

One known drawback of the prior art is that the moulding of tread blocks including a plurality of sipes requires a large number of vents, due to the numerous angular portions situated in the cavities used to mould said tread blocks. In order to limit the number of vents, application FR1553264 discloses a blade the portion of which used for moulding a sipe includes a hole allowing the air to flow from an angular portion that is not connected to a vent to another portion that is connected to a vent. Said hole is situated in the vicinity of the anchoring portion of the blade and has a diameter of at least 1 mm. During the moulding of the tyre, a joint of uncured gum rubber is formed through the hole, and then vulcanized. During the removal of the tyre from the mould, said joint is then cut by the blade as it is extracted from the sipe.

However, the air is not discharged satisfactorily. In addition, the holes weaken the blade and restrict the design thereof, which limits designers' room for manoeuvre and, as a result, the performance of the tyre. Finally, the portions of the tread resulting from the cutting, or even ripping, of the junctions, form weak points, such as incipient tears, which reduce the performance of the tyre.

One aim of the invention is to overcome the aforementioned drawbacks and provide an original solution for improving the moulding of the tyres, while ensuring high performance levels.

SUMMARY

To this end, the invention proposes a method for curing a tyre during which a green tyre is pressed against the lining of a curing mould provided with a venting device, the moulding surface of said lining forming protrusions that define cavities, the venting device comprising vents that pass through the lining, at least one cavity being divided into chambers by at least one protrusion in the form of a blade, each cavity closing on one or more vents, at least one of said chambers not closing on a vent, at least one duct passing through the blade so that the chamber(s) that does/do not close on a vent communicate(s) through the duct with a chamber that closes on a vent.

According to the invention, the cross-section of the duct has an area of between 0.0001 mm$^2$ and 0.25 mm$^2$ and, more preferably, 0.01 mm$^2$ and 0.1 mm$^2$.

The cross-section of the duct thus has a small area. The same applies to the uncured gum rubber joint formed though the duct during the vulcanization step.

As a result, said joint is easier to cut than the joint formed by the duct of the prior art. In addition, the portions of the tread resulting from the cutting of the duct are small, and do not therefore weaken the tread. The performance of the tyre is therefore improved.

Next, said small area makes it possible to position the duct as close as possible to the angular portions from which the air must be discharged, unlike the duct of the prior art, the circular shape and larger dimensions of which do not make it possible to completely reduce the volume of the air pocket formed between the angular portion of the mould and the green tyre.

Finally, ducts with a smaller cross-section weaken the blade less. The means for reinforcing the blade, such as stiffeners, can therefore be of limited size and/or thickness. The blade limited in this way is therefore thinner. The same applies to the sipe moulded by the blade. Finer sipes make it possible to optimize certain aspects of the performance of the tyre, such as stiffness.

Preferably, the blade includes a moulding portion on which a plurality of ducts are arranged 0.01 mm to 2 mm apart, and more preferably 0.1 mm to 0.5 mm apart.

The production of a group of ducts in a dense "cluster" or "bunch" makes it possible to optimize the efficiency of the air flow between the chambers without weakening the blade.

Advantageously, the ducts are arranged secant or adjacent to, or at most 5 mm and, more preferably, 2 mm from a contour defining the intersection between the blade and the radially outermost surface of the cavity.

The proximity of a duct to said contour thus makes it possible to optimize the efficiency of the venting device by allowing the duct to discharge air for as long as possible or, in other words, until the air pockets trapped in the angular portions of the chambers are completely reduced.

Preferably, the blade includes an anchoring portion, submerged in the body of the lining, on which the ducts are arranged adjacent to or at most 2 mm from a contour defining the intersection between the blade and the radially outermost surface of the cavity.

The ducts can thus continue to discharge air even when an air pocket trapped in an angular portion of a chamber is fully reduced.

Advantageously, the blade includes a stiffener along a contour defining the intersection between the blade and the radially outermost surface of the cavity, having a height of up to 2 mm and, preferably, of 0.6 to 1.4 mm.

The stiffeners can therefore be of limited size and/or thickness. The blade limited in this way is therefore thinner. The same applies to the sipe moulded by the blade. Finer sipes make it possible to optimize certain aspects of the performance of the tyre, such as stiffness.

Preferably, the ducts are at most 5 mm and, preferably, 2 mm from the angular portions of a chamber. Such an arrangement of the ducts makes it possible to optimize the discharge of the air.

The invention also relates to a tyre for being mounted on the rim of a wheel, characterized in that it is obtained by a method for curing a tyre according to the invention, the external surface of the tread of said tyre having protrusions that take the form of nipples corresponding to the respective negative impressions of the ducts, and preferably having a height equal to or greater than 0.02 mm.

The invention also relates to a method for manufacturing a curing mould for a tyre according to the invention, in which:
the blade is manufactured using a method or combination of methods selected from the following group: removal of material such as laser cutting, plastic deformation such as stamping, or additive manufacturing such as consolidation by selective melting, then
the duct(s) are produced by means of a laser piercing method, and
the blade is assembled with the body of the lining.
According to one variant embodiment:
the blade is manufactured and the duct(s) is/are produced simultaneously by means of an additive manufacturing method, then
the blade is assembled with the body of the lining.
According to one variant embodiment, the body of a lining element is manufactured, the blade is manufactured, and the ducts is/are produced simultaneously by means of an additive manufacturing method.

BRIEF DESCRIPTION OF THE FIGS.

Figure 2:
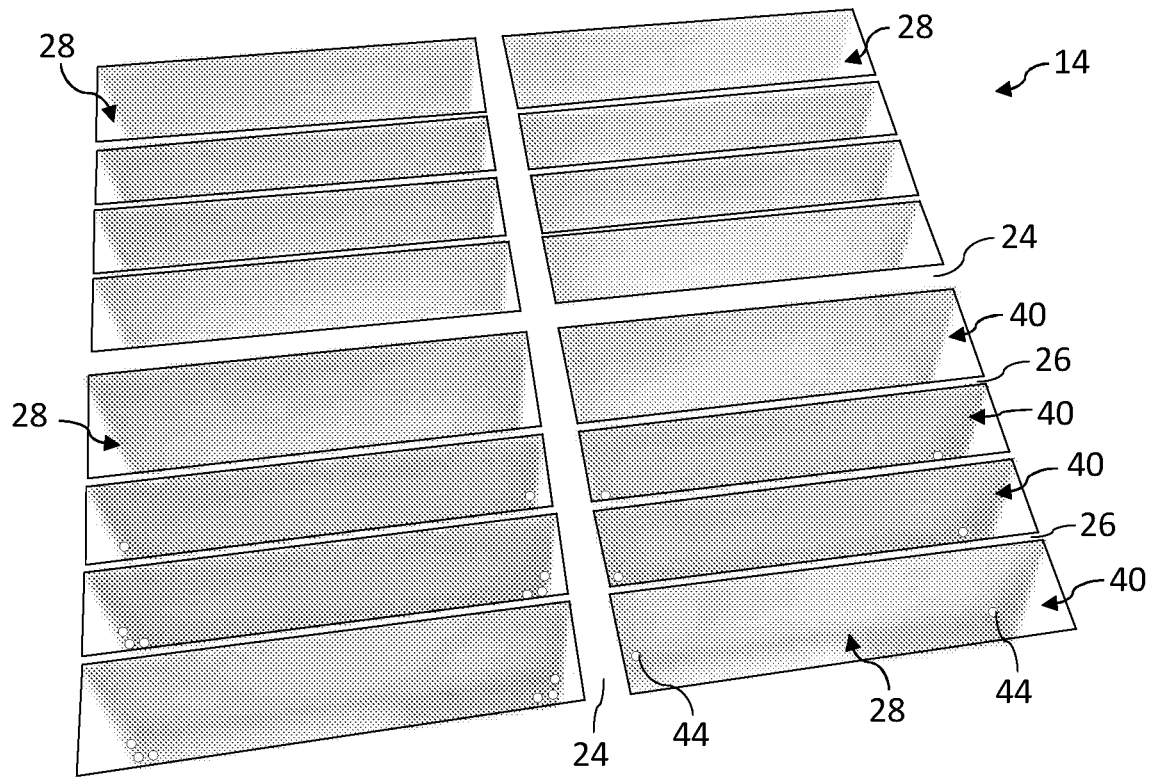

The invention will be better understood from the rest of the description, which is supported by the following figures:
FIG. 1 is a radial cross-sectional view of certain elements of a curing mould according to the invention;
FIG. 2 is a perspective view of a portion of the moulding surface of the lining of the curing mould in FIG. 1;
FIG. 3 is a front view of certain elements of the lining in FIG. 2;
FIG. 4 is a side view of certain elements of the lining in FIG. 2;
FIG. 5 is a front view of a blade in FIG. 2.

DETAILED DESCRIPTION

In the various figures, elements that are identical or similar have the same reference signs. They are not therefore systematically described again.

FIG. 1 schematically illustrates a curing mould 10 for a tyre used to mould and vulcanize a green tyre, in order to obtain a tyre having the desired geometry and appearance. The mould defines an internal space having a general symmetry of rotation about a central axis 12. The curing mould comprises a frame, moulding elements, vulcanizing means, and means for opening and closing the mould. The opening and closing means are suitable for causing the moulding elements to move between an open position and a closed position. The open position corresponds to the step of removing a moulded, vulcanized tyre, and to the step of introducing a new green tyre. The closed position (FIG. 1) corresponds to the step of moulding and vulcanizing the green tyre. The vulcanizing means are suitable for providing the heat energy and pressure respectively necessary for vulcanizing and moulding the green tyre. By way of example, the thermal energy and pressure are provided by pressurized water vapour circulating around the mould and inside the green tyre in an extendible membrane. In the closed position of the mould, the moulding elements form a moulding surface 14 that is the negative of the desired external surface of the tyre. The moulding elements more particularly comprise a lining 16 for moulding the tread of the tyre, two shells 18 for moulding the sidewalls of the tyre, and two rings 20 for moulding the beads of the tyre.

FIG. 2 illustrates a portion of the moulding surface 14 forming hollows or protrusions. The protrusions extend from the outside of the mould towards the inside of the mould. By way of example, the protrusions take the form of parallelepipeds, grooves 24 extending circumferentially and/or transversely, or blades 26 or spurs. The protrusions 24, 26 define angular or rounded cavities 28. By way of example, the cavities take the form of prisms, or extend circumferentially and/or transversely along a polygonal cross-section. The moulding surface 14 is circumscribed by a substantially cylindrical or toric external former, known as the "crown form".

Hereinafter, unless otherwise stated, an axial or transverse direction denotes a direction parallel to the central axis 12; the radial direction 32 denotes a direction perpendicular to the central axis and therefore intercepting it; and the circumferential direction denotes a direction perpendicular to a radial direction, and orthogonal to the central axis.

FIGS. 3 to 5 illustrate more particularly a cavity 28 comprising at least one blade 26. The cavity 28 closes on a radially outermost bottom wall 30 of said cavity, and optionally tangent to the crown form.

The lining 16 is divided into a plurality of lining elements, each lining element including a plurality of blades 26, a body 32 and optional inserts. A blade 26 is a thin moulding element the thickness of which generally varies between 0.2 and 2 mm. The blade 26 includes a moulding portion 34 that extends radially from the bottom wall 30, and an anchoring portion 36 suitable for being submerged in the body 32 of the lining element. By way of example, a blade 26 is obtained using a method for removing material such as laser cutting, plastic deformation such as stamping, additive manufacturing such as consolidation by selective melting, or a combination of these methods. Preferably, a lining element is obtained using a casting method by overmoulding the body 32 of the lining element around the anchoring portion 36 of the blades, or by manufacturing the body 32 of the lining element using an additive manufacturing method, then assembling said body with the blades. The blades 26 can be assembled with the lining body 32 so as to produce a lining element using an assembly method by screwing, bonding, or welding, or any other appropriate assembly method. Finally, a lining element can be obtained by an additive manufacturing method in which the body 32 of the lining element and the moulding portion 34 of the blades are produced in one piece.

The curing mould 10 is provided with a venting device suitable for discharging the air trapped between the external surface of the green tyre and the moulding surface 14. To this end, the venting device comprises vents 38 (FIG. 4) that pass through the lining 16, forming so many passages for the air to the outside of the mould. Each cavity 28 closes on one or more vents. By way of example, a vent 38 takes the form of a hole, or of the passage resulting from the assembly clearance between a blade 26 and the body 32 of a lining element.

At least one cavity 28 is divided into chambers 40 by at least one blade 26. "Chamber" is not given to mean a hermetically sealed space formed by the division of the cavities by the blades; it is given to mean a space in which air might be trapped between the rubber entering the chamber and the last moulding zones of the chamber and, more particularly, the angular portions of the chamber. "Angular portion" is given to mean that the walls that make up the chamber or the cavity form intersections the radius or bevel of which is less than 5 mm.

At least one of said chambers 40 does not close on a vent 38, thus preventing the air from a pocket from being discharged to the outside of the mould 10. At least one duct 42 passes through the blade 26 so that the chamber that does not close on a vent 38 communicates through the duct 42 with a chamber that does close on a vent 38. The air can thus flow from an air pocket located in a non-vented chamber to a vented chamber. By way of example, a cavity 28 can be divided into a series of chambers 40, all of the chambers communicating with each other in a given network by means of ducts 42, the number of vented chambers being greater than or equal to 1, and strictly less than the total number of chambers of the cavity 28.

According to the invention, the cross-section of a duct 28 has an area of between 0.0001 mm$^2$ and 0.25 mm$^2$ and, more preferably, 0.01 mm$^2$ and 0.1 mm$^2$. The cross-section of a duct is therefore small and weakens the blade less. The blade includes a plurality of ducts 42 arranged in alignment or in any other appropriate arrangement, and the ducts are 0.01 mm to 2 mm apart and, more preferably, 0.1 mm to 0.5 mm apart. The density of the ducts is up to 100 ducts per mm$^2$ and, more preferably, up to 25. The ducts are arranged secant or adjacent to, or at most 5 mm and, more preferably, 2 mm from a contour 44 defining the intersection between the moulding portion 34 of the blade and the bottom wall 30 of said cavities. The ducts 42 are adjacent to or at most 5 mm and, more preferably, at most 2 mm, from the last moulding zones and, in particular, from the angular parts of a chamber 40.

According to one variant embodiment, when the blade 26 is produced separately from the body 32 of the lining element, the ducts 42 are arranged on the anchoring portion 36 of the blade, adjacent to or at most 2 mm from the contour 44.

The blade 26 includes a stiffener along the contour 44 having a height, along the extension of the blade towards the inside of the mould, of up to 2 mm and, preferably, between 0.6 and 1.4 mm. "Stiffener" is given to mean an additional thickness across the contour of the moulding portion 34 preventing the blade from being elastically or plastically deformed during the moulding step or the mould removal step.

By way of example, the axial cross-section of a duct has a circular outline having a diameter of between 0.01 mm and 0.5 mm and, more preferably, 0.05 mm and 0.3 mm; a polygonal outline, for example triangular, having a base or height of between 0.1 and 0.7 mm and a curvature at the vertices of between 0.01 mm and 0.2 mm; or an outline in the form of a slot with a width of between 0.1 and 0.3 mm.

In the example illustrated in FIG. 3, ducts 42 pass through the blade, arranged in an alignment, on the moulding portion 34 of the blade. In the example illustrated in FIG. 5, a duct 42 is adjacent to the contour 44. The ducts have a circular cross-section having a diameter equal to 0.2 mm, and the ducts are spaced at least 0.2 mm apart.

According to a first variant embodiment, during the manufacturing of a curing mould according to the invention, a blade 26 is manufactured using a method or combination of methods selected from the following group: removal of material such as laser cutting, plastic deformation such as stamping, or additive manufacturing and, more preferably, selective consolidation by melting. The duct(s) 42 is/are then produced by means of a laser piercing method. A laser piercing method is particularly suitable for producing ducts 42 with an axial cross-section having a circular outline with a diameter of between 0.05 mm and 0.3 mm, through a thin blade with a thickness of between 0.2 mm and 2 mm. The blade 16 is then assembled with the body of the lining element.

"Additive manufacturing" is given to mean a manufacturing method in which material is added.

"Selective consolidation by melting" is given to mean an additive manufacturing method with the aim of gradually and selectively aggregating or agglomerating additional input work material so as to obtain an output work material. The input work material takes the form of and/or is included in the composition of a powder, a wire or a solution/bath. The input work material is generally added by depositing a powder on a substrate so as to form a layer. The substrate takes the form of a plate or a previously agglomerated layer. Agglomeration is generally obtained by solidification of the input work material that has been fully or partially melted (sintered) by a localized or generalized energy input, then cooled. The energy input is generally provided by a laser or an electron beam, although it can be provided by induction or infrared radiation. In the case of a laser or an electron beam, the energy input is localized by means for orienting the energy input, such as optical or electromagnetic means respectively. The method gives the input work material a predetermined shape and mechanical properties. Said shape and said properties depend on the material of the input work material and the parameters of the method. Said shape is generally a one-piece solid, although it can consist of a plurality of one-piece solids.

According to a second variant embodiment, the blade 26 is manufactured and the duct(s) 42 is/are produced simultaneously using an additive manufacturing method. An additive manufacturing method is particularly suitable for producing ducts 42 with an axial cross-section having a circular outline with a diameter of between 0.01 mm and 0.5 mm. The blade 26 is then assembled with the body 32 of the lining element.

According to a third variant embodiment, the body 32 of a lining element, the moulding part 34 of the blade(s) and the duct(s) 42 are manufactured in one piece, using an additive manufacturing method.

Other variants and embodiments of the invention can be envisaged without departing from the scope of these claims.

The invention claimed is:

1. A method for curing a tire comprising the steps:
   pressing a green tire against a lining (16) of a curing mold (10) provided with a venting device;
   forming protrusions that define cavities (28) in the molding surface (14) of the lining, the venting device comprising vents (38) that pass through the lining;
   dividing at least one cavity (28) into chambers by at least one protrusion in the form of a blade (26);
   closing each cavity (28) on one or more vents (38), with at least one of the chambers (40) not closing on a vent; and
   passing at least one duct (42) through the blade (26) so that the at least one chamber (40) that does not close on a vent (38) communicates through the duct (42) with a chamber (40) that does close on a vent (38),
   wherein a cross-section of the duct (42) has an area of between 0.0001 mm$^2$ and 0.25 mm$^2$.

2. The method according to claim 1, wherein the blade (26) includes a molding portion (34) on which a plurality of ducts (42) are arranged between 0.01 mm and 2 mm apart.

3. The method according to claim 1, wherein the ducts (42) are arranged secant or adjacent to, or at most 5 mm from a contour (44) defining an intersection between the blade (26) and a radially outermost surface (30) of the cavity (28).

4. The method according to claim 1, wherein the blade (26) includes an anchoring portion (36), submerged in a body (32) of the lining (16), on which the ducts (42) are arranged adjacent to or at most 2 mm from a contour (44) defining an intersection between the blade (26) and a radially outermost surface (30) of the cavity (28).

5. The method according to claim 1, wherein the blade (26) includes a stiffener (46) along a contour (44) defining an intersection between the blade (26) and a radially outermost surface (30) of the cavity (28), having a height of up to 2 mm.

6. The method according to claim 1, wherein an axial cross-section of a duct (42) has a circular outline having a diameter of between 0.01 mm and 0.5 mm.

7. The method according to claim 1, wherein an axial cross-section of a duct (42) has a triangular outline having a base or height of between 0.1 and 0.7 mm.

8. The method according to claim 1, wherein an axial cross-section of a duct has an outline in the form of a slot having a width of between 0.1 and 0.3 mm.

9. The method according to claim 1, wherein the ducts (42) are at most 5 mm from angular portions of a chamber.

10. A curing mold (10) for a tire comprising:
    a lining (16), the molding surface (14) of the lining forming protrusions that define cavities (28);
    a venting device comprising vents (38) passing through the lining, each cavity (28) closing on one or more vents (38), a cavity (28) being divided into a plurality of chambers (40) by at least one protrusion in the form of a blade (26), at least one of the chambers (40) not closing on a vent (38);
    at least one duct (42) passing through the blade (26) so that the at least one chamber (40) that does not close on a vent (38) communicates through the duct (42) with a chamber (40) that does close on a vent (38),
    wherein a cross-section of the duct (42) has an area of between 0.0001 mm$^2$ and 0.25 mm$^2$.

* * * * *